June 8, 1954 L. A. PAZANDAK 2,680,340
SICKLE HEAD MECHANISM WITH SUPPORT MOUNTING
Filed Dec. 30, 1949 2 Sheets-Sheet 1
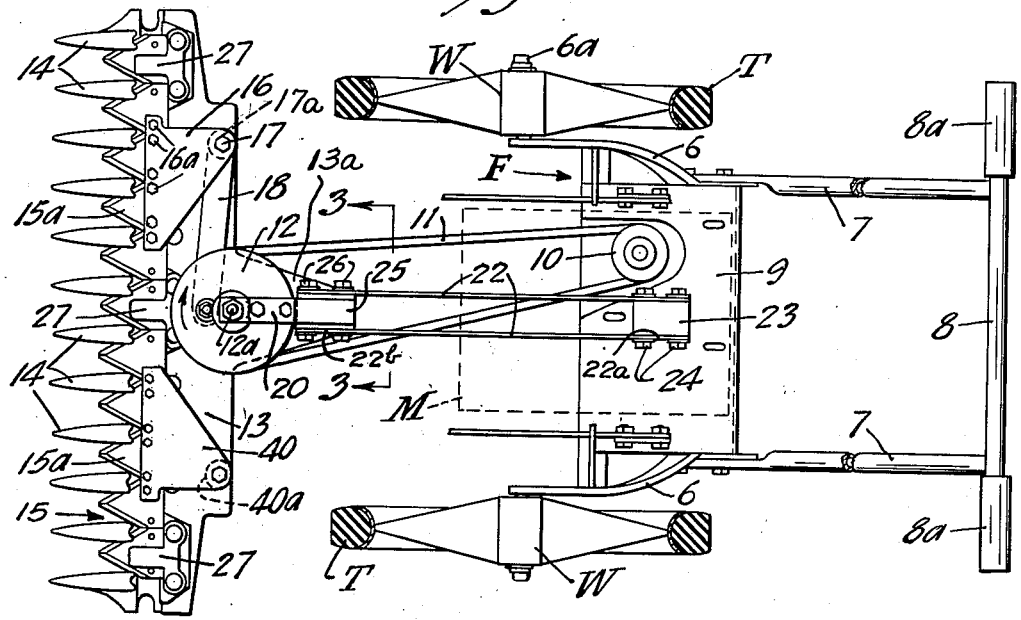
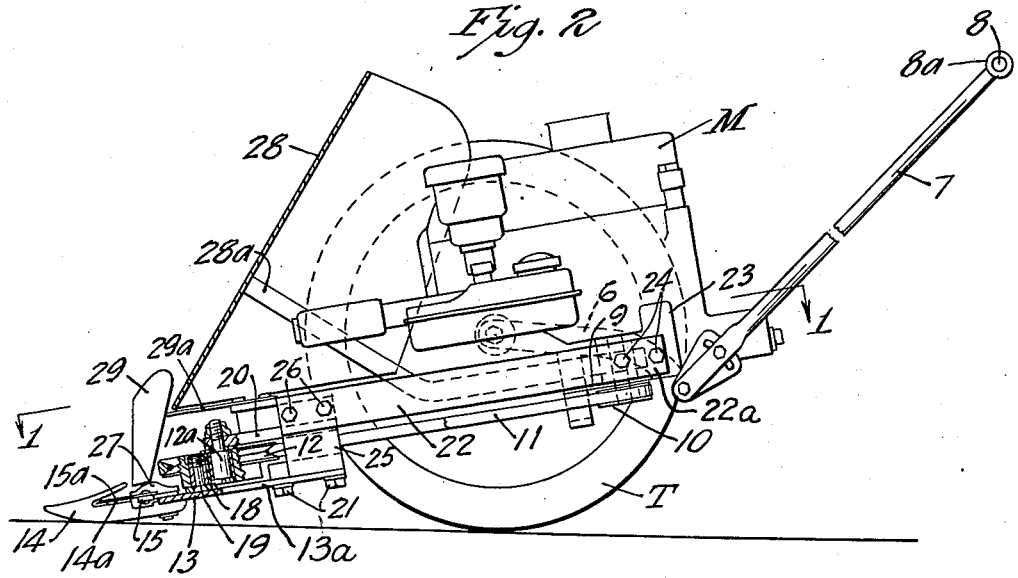
Inventor
Louis A. Pazandak
By Williamson & Williamson
Attorneys June 8, 1954  L. A. PAZANDAK  2,680,340
SICKLE HEAD MECHANISM WITH SUPPORT MOUNTING
Filed Dec. 30, 1949  2 Sheets-Sheet 2
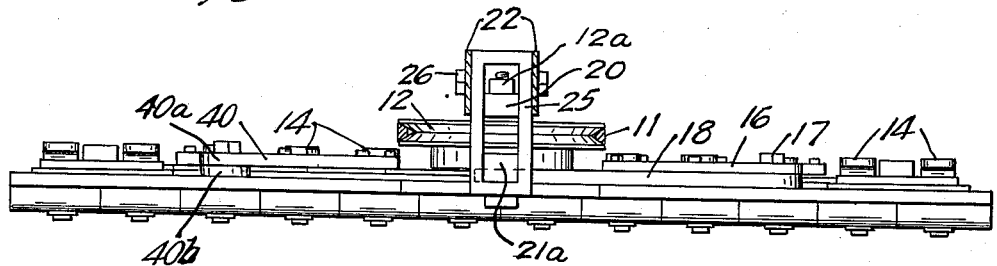
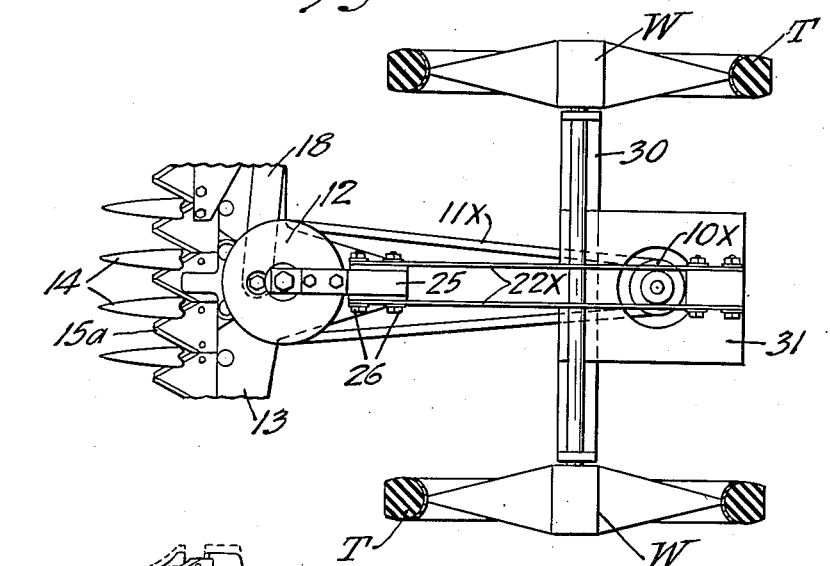
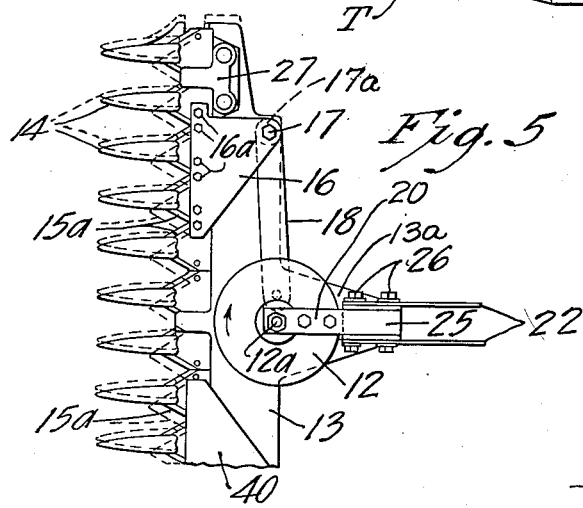
Inventor
Louis A. Pazandak
By Williamson & Williamson
Attorneys Patented June 8, 1954

2,680,340

UNITED STATES PATENT OFFICE 2,680,340

SICKLE HEAD MECHANISM WITH SUPPORT MOUNTING

Louis A. Pazandak, Minneapolis, Minn., assignor to Toro Manufacturing Corporation, Minneapolis, Minn., a corporation of Minnesota Application December 30, 1949, Serial No. 135,861

3 Claims. (Cl. 56—26.5)

This invention relates to machines for cutting weeds, tall grass, stalk crops and relatively light undergrowth such as is embodied in so-called motor scythes, swathers and other machines utilizing reciprocatory sickle knife mechanism with a power means for driving the same.

In such machines, the intense vibration set up through the fast, transverse reciprocation of the sickle knife is transmitted to the frame, wheels and guiding handle of the cutting machine, decreasing the efficiency of cutting, interfering with the direction of travel of the machine over the ground and in the case of hand-guided machines vibrating the guiding handle to the extent of providing discomfort to the hands and arms of the operator as well as making the uniform guiding of the machine inaccurate and in some cases, unmanageable.

It is an object of my invention to provide a simple but efficient mounting for the sickle head mechanism of reciprocatory cutters and mowers which will cause the reciprocating mass of the sickle knife to be substantially balanced by the mass of the cutter bar and other non-reciprocating parts of the sickle head yieldably mounted and reciprocating in opposite directions whereby a substantial portion of the over-all vibration produced is neutralized and absorbed in the sickle head itself and consequently, cannot be transmitted to the frame, wheels and guiding handles of conventional power scythes and mowers.

A further object is the provision of a simple, relatively inexpensive reciprocating power mechanism or machine adapted to efficiently cut grass or other stalks at high speeds and adapted to cause short cut material to be worked outwardly and rearwardly over the sickle knife and cutter bar in contrast to sickle heads of conventional type.

Another object is the provision of a reciprocating mower mechanism and support wherein the sickle knife may with safety be driven at higher speeds than are now conventionally used, wherein my structure is capable of long continuous use and wherein tendency for vertical vibration of the sickle head is substantially eliminated.

A more specific object is the provision of a novel and highly efficient sickle head mounting and sickle knife driving mechanism which provides a resilient, substantially floating support for the cutter bar and related parts considered as non-reciprocating parts in conventional mower structure whereby reciprocation of the cutter knife produces counter and cushioned reciprocation of the cutter bar and its guards and guiding structure to combat and substantially absorb cutter knife reciprocation.

These and other objects and advantages of my invention will more fully appear from the following description made in connection with the accompanying drawings wherein like reference characters refer to similar parts throughout the several views and in which:

Fig. 1 is a top plan view of an embodiment of my invention applied to a mowing machine of the so-called power scythe type, the motor and protecting housing being removed but the power take-off pulley being illustrated, the view being taken approximately along the line 1—1 of Fig. 2;

Fig. 2 is a side elevation of the same with some portions of the sickle head broken away and others shown in section to illustrate the driving mechanism;

Fig. 3 is a vertical cross section on a larger scale taken on the line 3—3 in Fig. 1;

Fig. 4 is a fragmentary plan view of a somewhat different embodiment of my invention wherein power driving mechanism for the sickle bar is centrally balanced and related to the combination support and mounting; and Fig. 5 is a fragmentary plan view illustrating in dotted lines the "snaking" action of the cutter bar during movement of the sickle knife.

As shown in the drawings, my improved mechanism is applied to a mowing machine of the two wheeled, hand-guided type comprising a main frame F adapted for travel over the ground and having a pair of forwardly extending frame legs 6 having stub shafts 6a secured in co-axial relation to the forward ends thereof upon which suitable supporting wheels W are journaled, having as shown, suitable rubber or pneumatic tires T preferably equipped with ground-engaging treads. A pair of rearwardly and upwardly extending handle supporting arms 7 are bolted or otherwise rigidly affixed to the sides of the frame and legs 6 having secured at the outer ends thereof, a horizontal transverse guiding handle 8 which may have somewhat compressible hand-receiving sleeves 8a affixed to the terminal portions thereof. The frame or chassis carries a rigid, transversely extending motor supporting plate or body 9 traversing the frame legs 6 and upon which is mounted an upstanding internal combustion motor M having as shown, a vertical power take-off pulley 10 mounted at the underside of base thereof and connected by an endless belt 11 with a combination driven pulley and crank member 12 journaled in the forwardly disposed sickle head construction.

The sickle head construction includes a rigid cutter bar or sickle head 13 having suitable guards 14 equipped with cutter knife-receiving ledger plates 14a removably secured thereto, said head in conventional manner furnishing a straight line transverse guide for the reciprocating sickle knife 15 which has secured to its conventional V-shaped cutter teeth or blades 15a working in reciprocating manner in the said ledger plates. Sickle knife 15 has attached to the upper side thereof, above the cutter blades 15a, a substantially triangular, horizontal driving plate 16 located adjacent the one end of the sickle bar and detachably secured by attachment bolts 16a. The rear and outer corner of the driving plate 16 as shown, is provided with an upstanding bearing 17a which may be in the form of a bushing to receive the wrist pin 17 of the outer end of a connecting rod or horizontal pitman 18 working just above the sickle head member 13 and pivotally connected with eccentric relation to the driven pulley 12 by an upstanding crank pin 19 eccentrically positioned in the pulley 12. The driven pulley 12 is pivotally mounted between a stem 13a of the sickle head T bar 13 and a rigid, parallel, heavy frame bar 20 which together form a rigid yoke or mounting for the sickle head construction, said bar and stem 13a of the T head being suitably secured together and rigidly spaced apart by spacer members 21a and bolts 21 which constitute an attachment means for support of the entire sickle head construction from the chassis or wheel-supported frame.

A guiding plate 40 similar as shown, in shape and size to the driving plate 16 is bolted to the left hand portion of the sickle knife and has its rearwardly disposed apex 40a superimposed over the rear portion of the sickle head or bar 13. A wear plate or button 40b depends from the underside of plate 40 in sliding engagement with the smooth upper surface of horizontal sickle head 13 whereby plate 40 at its rearward end is maintained in a predetermined position to guide the sickle knife 15 causing the cutting edges of blades 15a to work with proper clearance against the ledger plates of the guard.

As indicated in Fig. 1, the driven pulley and eccentric 12 is revolved in a clockwise direction when viewed from above whereby the gyratory movement of the driving plate 16 and pitman 18 is outward and rearward, causing short lengths of stalks or other material cut to be worked rearwardly off the sickle bar and over the working mechanism described. This is an important advantage in sickle bar construction.

The connection of the entire sickle head and supporting means therefore in my improved construction, is made through the medium of a longitudinally disposed and laterally resilient beam construction as shown, comprising a pair of elongated, parallel spring bars 22 disposed in side by side, forwardly overhanging relation relative to the frame of my machine and having the rear ends 22a thereof rigidly affixed to a heavy, upstanding, U-shaped saddle or post member 23 by horizontal nutted bolts 24. Spring bars 22 are disposed edgewise when viewed in plan as shown in Fig. 1 and are constructed of suitable spring steel or other material possessing tensile strength and high resiliency. The forward ends 22b of the sickle head supporting spring bars 22 are rigidly secured to a U-shaped post or upstanding saddle 25 fixed to the rear portion 13a of the stem of the rigid T head or cutter bar 13 and extending upwardly therefrom. A pair of bolts 26 as shown detachably connect the entire sickle head construction with the forward end of spring bars 22. The spring bars 22, being disposed in edgewise relation to the horizontal plane, provide an elongated, forwardly extending, overhanging mounting or support for the sickle head adapted for vibration laterally of the frame of the machine but confined against up and down or vertical vibration.

A plurality of upper and forwardly extending sickle bar clips or guide lugs 27 are secured to the rigid T head 13 overlapping the rear portions of the cutter blades 15a which are affixed to the sickle or cutter knife 15 and in the form illustrated, being three in number located respectively adjacent the ends of the cutter bar and at the center thereof.

The flexible endless driving connections, including the endless belt 11, power take-off pulley 10 and driven pulley 12 are preferably located beneath the overhanging sickle head support or beam comprising the parallel, edgewise disposed spring bars 22. The entire sickle head is thus resiliently supported from the frame of the machine with freedom for lateral vibration and also limited twisting adjustment on an axis longitudinal of the frame and disposed intermediately of the spring bars 22.

As shown in Fig. 2, I prefer to shield the working mechanism of my machine by an upwardly extending, large, rearwardly declined housing 28 covering the front and portions of the sides of the motor M and extending downwardly to the top of the saddle post 25 above the driven crank pulley 12. At the lower forward portion of the machine just rearwardly of the sickle knife, an upstanding protector plate 29 is transversely mounted, extending the full width of the machine and preventing the movement or distribution of the cut stalks or other material into the path of the pitman 18, crank mechanism and driven pulley 12. The shield 29 may be supported from the cutter bar 13 and its related parts and braced by the forwardly extending arms 29a attached to the saddle post 25 while the larger inclined housing 28 may be supported from forwardly and upwardly extending side arms 28a affixed to the motor supporting plate 9 and/or legs 6 of the frame construction of the machine.

*Operation*

In operation, the motor M drives at high speed, a V-belt pulley 12 mounted pivotally and supported upon the sickle head construction, which pulley through crank pin connection with pitman 18 rapidly reciprocates the cutter or sickle knife 15 and the multiplicity of forwardly projecting V-shaped cutter blades affixed thereto. The driving of this sickle knife is accomplished by the highly simplified pitman and driving plate construction and because of the relation of the driving plate 16 disposed above the outer end of pitman 18 and its connection with the upper side of the sickle knife, the cutter blades 15a at their forward edges are maintained in the optimum relation to their ledger plates to assure efficient cutting.

With my driving connections, including the driven pulley 12 disposed horizontally and the horizontal pitman connection between said pulley and the horizontal driving plate 16, all tendency for vertical vibration upon the sickle head and its supporting mounting, is eliminated.

The rapid reciprocation of sickle knife 15 because of the resilient mounting of the cutter bar or T head 13 causes the cutter bar and the mass thereof and of the parts fixed thereto, to vibrate oppositely to the sickle knife combatting the mass vibration of the sickle knife and cushioning the same and substantially neutralizing the over-all vibration of the sickle head. The provision of a pair of overhanging spring beams 22 with the consequent parallelogram relation thereof provides a mounting which permits floating action of the cutter bar in horizontal direction while restricting or confining the cutter head against up and down vibration.

When the proper relation of supporting beam length, resiliency and strength of spring bars 22 is selected for the weight of the cutter head, very little vibration is transmitted to the frame, supporting wheels and guiding handles of the motor scythe or mowing machine.

The mechanism for converting rotary power from the motor to reciprocating motion of the cutter bar is extremely simple, consisting simply in the horizontal driven pulley 12 with an eccentric or offset crank pin connection with the horizontal connection rod or pitman 18 and the simple driving plate 16 connected with one of the end portions of the cutter bar and disposed at the top thereof.

As previously recited, the gyratory movement of the pitman or connecting arm 18 and its resultant effect when driven as indicated in Fig. 1 upon the sickle head and sickle bar causes short cut material to be worked outwardly to the right and rearwardly over the sickle bar and rearwardly of the horizontal head 13 as contrasted with sickle heads of conventional type which have a tendency in the reciprocating of the sickle bar to work out material forwardly, crowding the same between cutter knives and ledger plate. In this connection, the countervibration of the sickle bar, guards and other structure supported thereon, materially assists in freeing cut material and in working the same outwardly and rearwardly.

My structure, by the combination of the resilient, horizontal floating mounting for the cutter bar and ordinarily stationary parts and the horizontal positioning of the driving connections enables the sickle knife to be driven at high speeds as contrasted with most reciprocating mowers, often in excess of 1500 R. P. M. without danger of breakage or damage to the parts thereof. The opposite vibratory action of the sickle knife and cutter bar in the operation of my mechanism has been found to very materially improve the stalk-engaging functions of the guards and blades of the sickle knife, producing an increased efficiency of cutting over a wider range of speeds due to the effect of the horizontal movement of the guards (see Fig. 5) which tends to untangle matted grass stalks in preparation for cutting and then aids in clearing the cut material by means of the whipping action of the guard bar.

By the substantial absorption of the vibration of the sickle knife in the cutter head, the guiding and control of the vehicle and machine is materially improved with the substantial elimination of discomfort to the operator.

In Fig. 4 of the drawings a substantially perfectly balanced drive connection is illustrated wherein the power takeoff pulley 10-X of a source of rotary power such as an internal combustion engine (not shown), is centered relatively to the parallel spring-supporting bars 22-X connected with the cutter bar. Here, the chassis of the machine includes a transverse, U-shaped frame 30 mounted on the common axle for the wheels W and having rigidly attached thereto, a rearwardly disposed, large platform plate 31 which with the frame 30 comprises the support for the motor and the guiding handles (not shown). The endless driving belt 11-X of the second form, it will be noticed, is symmetrically positioned relative to the resilient support springs 22-X so that the center line of the drive and the center line of the forwardly extending, overhanging support are vertically aligned.

From the foregoing description, it will be seen that I have provided an exceedingly simple, relatively inexpensive mower construction which materially increases the cutting efficiency and permits relatively high reciprocating speeds to be used on the sickle knife. My novel resilient or floating mounting of the sickle head overcomes one of the serious objections to present day reciprocating mowers and in addition, contributes materially to a more efficient and faster cutting action.

With my structure, as disclosed, the entire sickle head may be tilted within limits along an axis longitudinally of the frame to effectively conform to the contours of the terrain.

It will of course be understood that various changes may be made in the form, details, arrangement and proportions of the parts without departing from the scope of my invention.

What I claim is:

1. In a mowing machine, a carriage, a horizontal cutter bar in front of said carriage extending transversely of the machine, a sickle knife slidable along said cutter bar, a rigid post carried by said carriage, a motor carried by said carriage and provided with a pulley, a rigid saddle carried by said cutter bar, laterally spaced thin resilient bars extending between and rigidly secured at front and rear ends to said saddle and said post, said resilient bars being of appreciably greater width than thickness and having their narrow edge faces constituting upper and lower surfaces of the resilient bars, said resilient bars being vibratable transversely of the mowing machine and rigid vertically, a driven pulley supported from said saddle over said cutter bar and rotatable about a vertical axis, a belt trained about the pulleys and transmitting rotary motion to the driven pulley, and a pitman bar extending horizontally and having one end pivoted to said driven pulley eccentric thereto and its other end pivotally connected with said sickle knife.

2. In a mowing machine, a carriage, a horizontal cutter bar in front of said carriage extending transversely of the machine, a sickle knife reciprocatable along said cutter bar, a rigid post carried by and extending upwardly from said carriage intermediate the width thereof, a motor carried by said carriage and provided with a pulley, a rigid saddle carried by and extending upwardly from said cutter bar in front of said post, thin resilient bars extending between and rigidly secured at front and rear ends against opposite side faces of said saddle and said post and thereby held in laterally spaced relation to each other, said resilient bars being of appreciably greater width than thickness and having their narrow edge faces constituting upper and lower surfaces of the resilient bars whereby the resilient bars are vibratable transversely of the mowing machine and substantially rigid vertically, and mechanism for imparting reciprocating motion to said sickle knife including a member rotatably carried by the saddle and having rotary motion transmitted to it from the pulley of said motor.

3. In a mowing machine, a carriage, a horizontal cutter bar in front of said carriage extending transversely of the machine, a sickle knife reciprocatable along said cutter bar, a motor carried by said carriage and provided with a pulley, thin laterally spaced resilient bars extending between and rigidly secured at front and rear ends to rigid portions of said carriage and said cutter bar, said resilient bars being of appreciably greater width than thickness and having their edge faces constituting upper and lower surfaces of the resilient bars, said resilient bars being thereby vibratable transversely of the mowing machine and substantially rigid vertically, a rotary member carried by said saddle, means for imparting reciprocating motion to said sickle knife from said rotary member, and means for transmitting rotary motion from said pulley to said rotary member.

References Cited in the file of this patent

UNITED STATES PATENTS

| Number | Name | Date |
|---|---|---|
| 1,039,021 | Bullock | Sept. 17, 1912 |
| 1,770,091 | Soss | July 8, 1930 |
| 2,219,494 | Rieger | Oct. 29, 1940 |
| 2,351,460 | Shelton | June 13, 1944 |

FOREIGN PATENTS

| Number | Country | Date |
|---|---|---|
| 251,501 | Germany | Oct. 3, 1912 |
| 28,696 | France | Dec. 15, 1924 |